March 8, 1949.  M. WINTERHALTER  2,463,840
METHOD OF MAKING SEPARABLE FASTENERS
Filed May 27, 1944  2 Sheets-Sheet 1
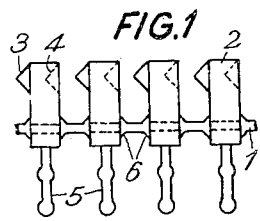
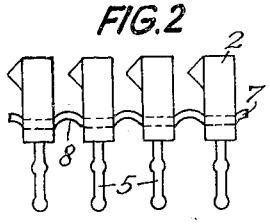
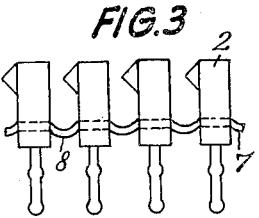
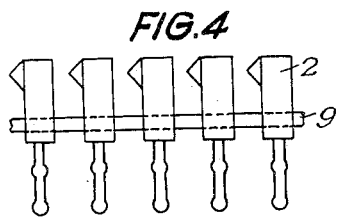
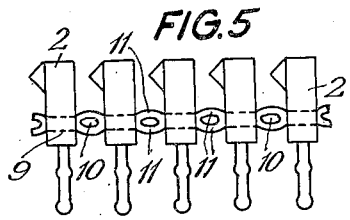
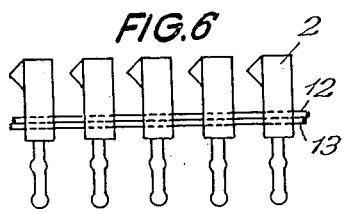
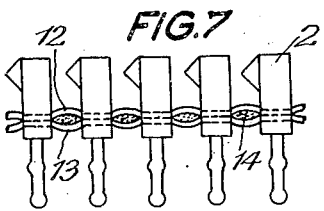
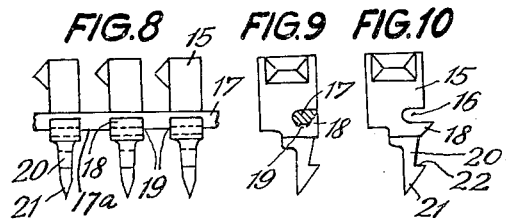
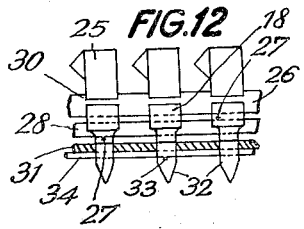
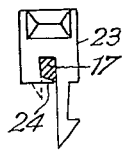
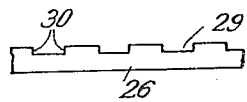
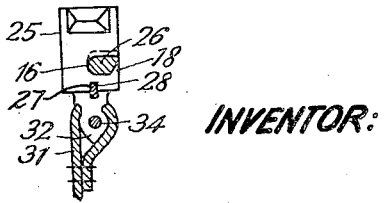
INVENTOR:
MARTIN WINTERHALTER,
By Emery Booth Townsend Miller & Weidner
ATTY's.

March 8, 1949. M. WINTERHALTER 2,463,840
METHOD OF MAKING SEPARABLE FASTENERS
Filed May 27, 1944 2 Sheets-Sheet 2

INVENTOR:
MARTIN WINTERHALTER

By Emery Booth Townsend Miller & Weidner ATTYS

Patented Mar. 8, 1949

2,463,840

UNITED STATES PATENT OFFICE 2,463,840

METHOD OF MAKING SEPARABLE FASTENERS

Martin Winterhalter, Morcote, near Lugano, Switzerland

Application May 27, 1944, Serial No. 537,593
In Switzerland April 15, 1943

Section 1, Public Law 690, August 8, 1946
Patent expires April 15, 1963

3 Claims. (Cl. 18—59)

The present invention relates to method of making separable fasteners of the type disclosed in my copending application Ser. No. 480,463 of March 25, 1943, which issued as Patent No. 2,380,623, on July 31, 1945. It has proved that in a slide fastener stringer which comprises a preferably elastically flexible carrier, for example of thermoplastic material, on which the fastener members are fixed by casting, die-casting or clamping thereon, the connection of the fastener members with the carrier is not in all cases sufficiently firm, and that the members can disengage from their seat on the carrier, since the material of the fastener members, preferably consisting of cast zinc, does not pass into an adherent connection with the material of the carrier, also when it is cast or die-cast on the carrier consisting of thermoplastic synthetic substance.

It is an object of the present invention to provide a slide fastener of the type disclosed in the above mentioned prior application which avoids this disadvantage.

According to the invention the fastener elements are correctly spaced on a carrier and secured to the carrier by the provision of shoulders or transverse retaining surfaces on the carrier engaging with the fastener elements to prevent a displacement of the elements along the carrier.

The accompanying drawings represent by way of example several embodiments of fastener stringers of slide fasteners according to the invention.

Fig. 1 is a side elevation of a fragment of a fastener stringer;

Figs. 2 and 3 are each a side elevation of a fragment of a modified form of fastener stringer;

Fig. 4 illustrates a step in making the fastener stringer according to Fig. 5, which latter is a side elevation of a fragment of a further modified form of fastener stringer;

Fig. 6 illustrates a step in making the fastener stringer according to Fig. 7, which latter is a side elevation of a fragment of a still further modified form of fastener stringer;

Fig. 8 is a side elevation of a fragment of another modified form of fastener stringer;

Fig. 9 is a vertical transverse section through the fastener stringer according to Fig. 8;

Fig. 10 is an elevation of one of the fastener elements of the stringer according to Fig. 8 before being applied to the fastener element carrier;

Fig. 11 is a vertical transverse section of another modified form of fastener stringer;

Fig. 12 is a side elevation of a fragment of another modified form of fastener stringer applied to an article, with parts in section;

Fig. 13 is a vertical transverse section through the fastener stringer according to Fig. 12;

Fig. 14 is a side elevation of the fastener element carrier according to Fig. 12;

Figure 15:
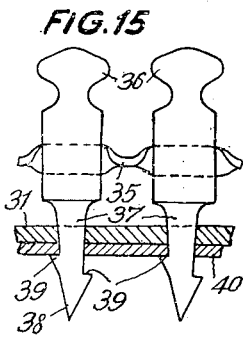
Fig. 15 is a side elevation of a fragment of another modified form of fastener stringer applied to an article, with parts in section.

Fig. 1 shows a fragment of a fastener stringer, which consists of a carrier 1 and of fastener elements 2 correctly spaced on the carrier. The fastener elements are provided with the usual coupling projection 3 and the recess 4, into which the coupling projection of the corresponding fastener element of the opposite fastener stringer can engage. Each fastener element 2 is formed with an extension stud 5, which serves for attaching the fastener stringer by sewing to the article of use to be provided with the slide fastener.

The carrier 1 originally had the shape of a straight thread or wire, for example of a thermoplastic synthetic substance, such as polyamide or another high molecular polycondensation product, of any desired circular, rectangular, triangular or other cross section. On this thread or string the fastener members 2 of zinc or also of a thermoplastic synthetic substance are cast or die-cast at the correct mutual distance; the elements can also be made previously, for example by casting or by punching from sheet metal and provided with a through opening in order to string them on the thread or wire. The portion of the carrier thread freely exposed between successive fastener elements 2 is then upset against the two opposite side faces of adjacent fastener elements, so that shoulders 6 bearing against these side faces are formed, which maintain the fastener elements between themselves and prevent a displacement of the same along the carrier thread 1, even when the seat of the fastener elements on the thread should become loose. Instead of by upsetting, the deformation of the thread portion situated between successive fastener elements for forming the shoulders, could also be obtained by die-pressing of the thread portions, for example with application of heat, when the carrier consists of thermoplastic material.

In the example according to Figs. 2 and 3 the fastener elements 2 placed on the carrier string 7 are secured in their position corresponding to the correct mutual distance, by deflecting the portions of the string 7, originally extending along a straight line, upwardly or downwardly. This deformation of the string 7 is effected while the fastener elements are maintained at the correct mutual distance, for example after heating of the thread, so that afterwards the thread permanently conserves the deformation imparted to it. The deflected portions 8 form shoulders bearing against the opposite lateral faces of adjacent fastener elements 2, which prevent a displacement of the elements along the carrier string 7.

In the example according to Figs. 4 and 5 the fastener elements 2 are cast or die-cast on a band-shaped carrier 9 of polyamide or another thermoplastic material at the correct mutual distance. Then the band portions situated between successive fastener elements are pierced by means of a pointed tool, while the elements are maintained at the correct mutual distance. These perforated band portions are thereby driven apart and expand so as to become larger than the band portions within the elements. The holes 10 in the carrier band then cannot close any more, and the enlarged portions 11 of the carrier form shoulders cooperating with the lateral faces of the fastener elements, which shoulders maintain the elements at their correct mutual distance along the carrier. Instead of casting the fastener elements 2 on the band-shaped carrier 9, this carrier also can be introduced through corresponding holes in fastener elements made before-hand.

In the example of embodiment according to Figs. 6 and 7 the fastener elements 2 are provided with an opening, through which two threads 12 and 13 of polyamide or like material are drawn, which form the carrier of the fastener elements. Between successive fastener elements the two portions of the threads are then driven apart as shown in Fig. 7, by maintaining the fastener elements at their correct mutual distance, so that the intermediate thread portion expands. The bent thread portions form shoulders cooperating with the lateral faces of the fastener elements and preventing a displacement of the elements along the carrier. In order that the thread portions situated between successive fastener elements permanently maintain their expanded position, a filler material 14 can be brought between the two thread portions, which becomes hard and remains adherent to the threads, so that these latter cannot approach each other any more.

In the example of embodiment according to Figs. 8, 9 and 10 the fastener element 15 is provided with a laterally open groove 16, in which the carrier thread 17 is inserted. After the different fastener elements of the stringer have been placed and correctly spaced on the carrier 17 the projection 18 at one side of the groove 16 is pressed or upset against the thread 17, whereby the groove 16 is closed so far at least, that the thread cannot slide out of it any more. The pressure applied on the projection 18 is so strong, that the thread portion enclosed in the groove 16 becomes compressed, i. e. that the material of this portion gives way laterally, whereby the thread portions situated outside of the fastener elements are formed with shoulders 19 bearing against the lateral faces thereof, which prevent a subsequent displacement of the elements. The fastener elements 15 are provided in this example with extension studs 20 comprising a pointed end portion 21 with a locking surface 22. For fixing the fastener stringer to the article of use to be provided with the slide fastener, the end portions 21 of the extension studs are stuck through the material of the article of use, whereafter the locking surface 22 bears from behind against the article of use and prevents the extension studs from being pulled out of the latter.

The example of Fig. 11 is similar to that according to Figs. 8 to 10, only the groove in the fastener element 23 for insertion of the carrier thread 17 is downwardly open. When the extension 24 of the fastener element is pressed against the inserted carrier thread the material of the thread gives way laterally and forms enlargements 17a (Fig. 8) at its portions situated between successive fastener elements which enlargements prevent a displacement of the fastener element along the carrier.

In the example of embodiment according to Figs. 12, 13 and 14, the fastener elements 25 are provided with a groove 16 for insertion of the carrier thread 26. These fastener elements are provided with a further opening 27, through which an auxiliary thread 28 is pulled. First the fastener elements are strung on the auxiliary thread 28, whereby the placing of the elements on the proper carrier thread 26 and the fixing of the elements on the latter is facilitated. The carrier thread 26 is formed with recesses 29 the distances of which correspond to the mutual distances of the fastener elements of the fastener stringer. After placing the fastener elements 25 on the auxiliary thread 28, and correctly spacing and securing them on this thread, the carrier thread 26 is inserted into the initially open grooves 16 of the fastener elements of the so formed stringer, each recess 29 of the thread 26 being inserted into a groove 16 of a fastener element and afterwards the projection 18 on the element is pressed towards the thread 26 for closing the groove 16. The lateral faces 30 of the recesses 29 form shoulders which bear against the lateral faces of the fastener elements 25, and maintain the members at the correct distance on the carrier. The portions of the auxiliary thread 28 situated between successive fastener elements can now be cut out, because this auxiliary thread has served its purpose after the elements are completely secured to the carrier 26. When however the auxiliary thread does not impair the desired flexibility of the fastener stringer, it also can remain. For fixing this fastener stringer on the article of use 31 the extension stud 32 of each fastener element 25 is provided with a pointed end having an opening 33. This end is stuck through the material of the article of use and then a retaining thread 34 is pulled on the rear side of the latter through the openings 33 of all extension studs and anchored at both ends of the fastener stringer. In this manner the extension studs are firmly connected with the article of use. Instead of pulling the auxiliary thread 28 through corresponding openings of the fastener elements 25, these latter could also be die-cast on the auxiliary thread.

Figure 16:
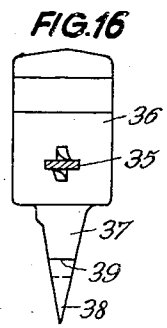
Fig. 16 is an end view of the fastener stringer according to Fig. 15, with parts omitted.

Figs. 15 and 16 show an example of fastener stringer in which a carrier thread 35 of polyamide or like material of rectangular cross section is pulled through openings in the fastener elements 36. For forming retaining faces which prevent a displacement of the fastener elements along the carrier thread 35, the portions of the thread situated between successive fastener elements are twisted about the longitudinal axis of the thread while the fastener elements are maintained at the correct mutual distance. It thereby results in an expansion of the material of the thread which conserves the deformation imparted to it. The twisted thread 35 forms retaining surfaces with respect to the lateral faces of adjacent fastener elements which prevent a displacement of the elements along the twisted thread. For fixing the fastener stringer to the article of use 31 to be equipped with the slide fastener, the fastener elements 36 possess extension studs 37 with a pointed end 38 on which are provided locking surfaces 39. These extension studs are stuck through the article of use 31 and through a washer strip 40 of polyamide or like material. The locking surfaces 39 then bear against the washer strip 40 and prevent the extension studs from being pulled out of the article of use.

Figures 17, 18:
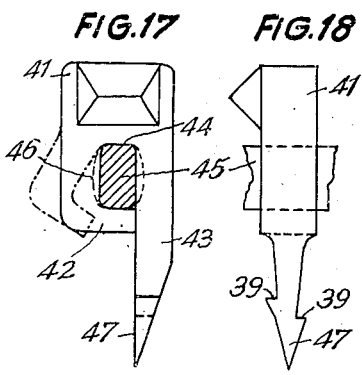
Fig. 17 is an end view, and Fig. 18 a side elevation, of a fragment of another modified form of fastener stringer.
Figures 19, 20:
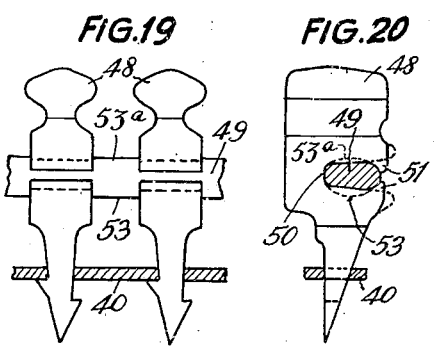
Fig. 19 is a side elevation of a fragment of another modified form of fastener stringer.
Fig. 20 is a vertical transverse section of the fastener stringer according to Fig. 19.

Figs. 17 and 18 represent a fastener element 41 which comprises two jaws 42 and 43, which between themselves form an opening 44 for the reception of the carrier thread 45. This thread for example possesses oval-shaped cross section and for its insertion into the opening 44 the jaw 42 of the fastener element is spread apart, as is shown in dash and dot lines in Fig. 17. After introduction of the carrier the jaw 42 is pressed against the jaw 43 and the portion of the thread 45 situated in the opening 44 is compressed. The portions of the thread situated between successive fastener elements thereby form shoulders 46, like the shoulders 30 illustrated in Fig. 14, bearing against the lateral faces of the fastener elements and which prevent a displacement of the fastener elements along the carrier. The connection of the fastener elements to the article of use is effected in the same manner as is represented in Fig. 15, the jaw 43 of the fastener element forming an extension stud 47 comprising locking surfaces 39 which, after sticking the studs through the article of use and a washer strip, prevent the disconnection of the studs from the article of use.

Figures 22, 23, 24, 25:
Fig. 22 illustrates a step in forming the fastener element carrier according to Fig. 19.
Figs. 23 and 24 are, respectively, sections on the lines XXIII—XXIII and XXIV—XXIV of Fig. 21.
Fig. 25 is a section, corresponding to Fig. 24, showing another modified form of fastener element carrier.

In the example of embodiment according to Figs. 19 to 24 the fastener elements 48 are fixed to a carrier 49 which is inserted in a groove 50 of the fastener elements and maintained by upsetting the two projections 51 of the fastener members across the groove. For making the carrier, one starts from a drawn thread 49$^a$ of polyamide of round cross section (Fig. 22) which is subjected to a rolling operation, in order to form flat portions or recesses 52 at those places at which the carrier is inserted into the grooves 50 of the fastener elements. Fig. 23 shows the cross section of the carrier along the line XXIII—XXIII of Fig. 21 at the portions situated between successive fastener elements, and Fig. 24 shows the cross section of the carrier at its portions enclosed in the groove 50 of the fastener elements. When the portions 51 of the fastener element are upset the clamping effect of those portions deforms the carrier also to form the shoulders 53$^a$ which also act to prevent displacement of the fastener elements. The shoulders 53 so formed bear against the lateral faces of the fastener elements and prevent a displacement of the elements along the carrier. Instead of by rolling the carrier, the portions of the carrier to be inserted into the grooves 50 could also obtain the cross section 49$^b$ represented in Fig. 25 by pressing. For attaching the fastener elements 48, its extension studs 47 are again stuck through the material of the article of use and through a washer disc of polyamide 40.

Figures 26, 27, 28:
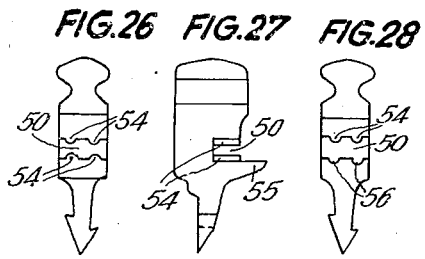
Fig. 26 is a side elevation of another modified form of fastener element for use in a fastener stringer.
Fig. 27 is an elevation of a face of the fastener element according to Fig. 26.
Figs. 28, 29, 30 and 31 are, respectively, side elevations of different further modified forms of fastener elements.
Figure 21:
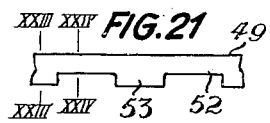
Fig. 21 is a side elevation of the fastener element carrier according to Fig. 19.
Figures 29, 30, 31, 32, 33:
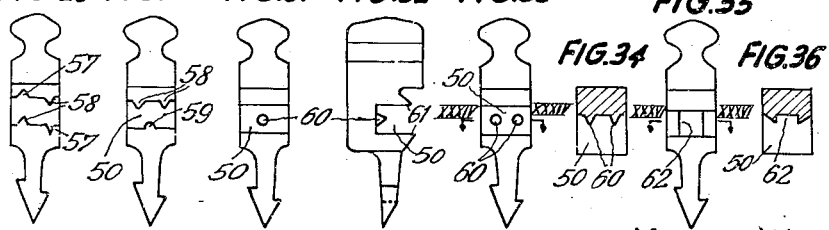
Fig. 32 is an elevation of a face of the fastener element according to Fig. 31.
Fig. 33 is an elevation of another modified form of fastener element.

In the fastener elements represented in Figs. 26 to 36 there are provided additional means in the groove 50 of the elements into which the carrier is inserted, for maintaining the elements on the carrier. In Figs. 26 and 27 ribs 54 are provided at the upper and lower face of the groove 50, which ribs extend from the front backwardly, or transversely to the carrier. The carrier is pressed into these grooves, so that the ribs 54 penetrate like teeth into the material of the carrier and prevent a displacement of the fastener elements relatively to the carrier. After insertion of the carrier into the groove 50, the projecting material 55 of the fastener element is upset over the carrier for closing the groove. In Fig. 28 there are provided ribs 54 on the upper side of the groove 50 and channels 56 on the lower side. When inserting the carrier into the groove 50 the material of the carrier is pressed into the channels 56 by the ribs 54 and prevents a displacement of the fastener elements. In Fig. 29 one channel 57 and one rib 58 are provided on the upper and on the lower side, and in Fig. 30 there are provided two ribs 58 on the upper side of the groove 50 and one rib 59 on the lower side.

Figures 34, 35, 36:
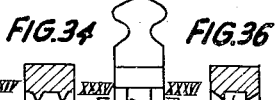
Fig. 34 is a section on the line XXXIV—XXXIV of Fig. 33.
Fig. 35 is an elevation of another modified form of fastener element.
Fig. 36 is a section on the line XXXVI—XXXVI of Fig. 35.
Figure 37:
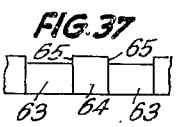
Fig. 37 is an elevation of another modified form of fastener element carrier.
Figure 38:
Fig. 38 is a transverse section of the carrier according to Fig. 37.

In the example of Figs. 31 and 32 a projecting point 60 is provided on the rear end of the groove 50. When the carrier is pressed into the groove 50, the point 60 penetrates into the material of the carrier. After insertion of the carrier the projections 61 of the fastener elements are upset over the carrier, the fastener member obtaining a fixed seat on the carrier owing to the point 60 penetrating into the carrier. In Figs. 33 and 34 which latter represents a section along XXXIV—XXXIV of Fig. 33, there are provided two points 60 at the rear end of the groove 50. In the example according to Figs. 35 and 36 a recess 62 is provided in the rear surface of the groove 50 on the fastener element, into which the material of the carrier is pressed when it is introduced in the groove.

Figures 39, 40:
Fig. 39 is an elevation of another modified form of fastener element carrier.
Fig. 40 is a transverse section of the carrier according to Fig. 39.
Figures 41, 42:
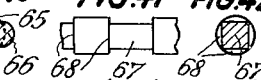
Fig. 41 is an elevation of another modified form of fastener element carrier.
Fig. 42 is a transverse section of the carrier according to Fig. 41.

Figs. 37 to 42 show three different examples of carrier threads which can be utilized for forming the fastener stringers with the represented fastener elements. For forming the carrier according to Figs. 37 and 38 one starts for example from a drawn thread of polyamide of round cross section. This thread is pressed at the places 63 destined for insertion into the fastener elements, so that these places receive a flattened cross section, while the portions 64 of the carrier situated between successive fastener elements remain circular and form one-sided shoulders 65, which prevent sliding of the fastener elements fixed on the carrier. In Figs. 39 and 40 the portions 66 of the carrier thread destined for insertion into the fastener elements are pressed in such manner that the pressed, flattened portion 66 is coaxial to the originally circular cross section, while the portions 64 between the fastener elements terminate in shoulders 65 at opposite sides thereof. In Figs. 41 and 42 the portions 67 of the carrier thread are pressed to square or rectangular shape and shoulders 68 are formed at four sides of the portion of the thread situated between the fastener elements.

Figure 43:
Figs. 43, 44 and 45 show other forms, respectively, of fastener element carriers.

Instead of forming the carrier of the fastener element from a single thread, several thin threads, for example threads 69 of polyamide could be twisted to form a carrier cord 70, as shown in Fig. 43. For fixing the fastener elements at this cord one can proceed in the same manner as in the different above described examples for a single carrier thread, for example by placing the fastener elements on the cord and subsequently deforming it, as has been described with reference to Figs. 2, 3, 5, 7, 8 to 10 or 11, or the cord can previously receive a profile by pressing or rolling, as is shown in Figs. 14, 21, or 37 to 42.

Figure 44:
Figure 45:

In order to obtain a firmer seat of the fastener elements on the carrier, for example when fastener elements of cast zinc and carriers of polyamide or similar threads of synthetic substances are used, a textile thread 72 can be spun tightly around the carrier thread 71 (Fig. 44); it is also possible to twist several textile threads about the polyamide thread, or a textile thread 74 can be spun or twisted about several polyamide threads 73 (Fig. 45) placed parallelly or twisted to a cord. In order to obtain rigidity of the spun threads or a firm connection of the textile threads with the polyamide thread, the spun thread can be impregnated, or stuck together, for example with a solution of the synthetic substance of which the carrier threads consist or also with a suitable paste. For producing fastener stringers by means of such carriers one proceeds in the same manner as has been described above.

I claim:

1. The method of making fastener stringers of separable fasteners, which consists in placing fastener elements at regularly spaced intervals on a carrier member, and, after the fastener elements are so placed, deforming those portions only of the carrier member which are between adjacent fastener elements to form retaining faces cooperating with the fastener elements acting to prevent displacement of the elements along the carrier.

2. The method of making slide fastener stringers which comprises forming an assembly consisting of fastener elements in spaced relation on a wire-like carrier formed of at least two strands of deformable material with the carrier extending through openings in said elements, mutually spreading apart those portions only of said strands which are between adjacent fastener elements to form retaining shoulders for engagement with the faces of said elements whereby to hold said elements in spaced relation, and inserting a filler between such spread apart portions for maintaining them spread apart.

3. The method of making slide fastener stringers which comprises forming an assembly consisting of fastener elements in spaced relation on a wire-like carrier of deformable material with the carrier extending through openings in said elements; and deforming those portions only of the carrier which are between adjacent fastener elements to form retaining shoulders for engagement with the faces of said elements, whereby to hold said elements in spaced relation, by piercing those portions for spreading apart the material of the carrier at opposite sides of the pierced openings.

MARTIN WINTERHALTER.

REFERENCES CITED

The following references are of record in the file of this patent:

UNITED STATES PATENTS

| Number | Name | Date |
|---|---|---|
| 1,680,266 | Galat | Aug. 7, 1928 |
| 1,817,837 | Poux | Aug. 4, 1931 |
| 2,102,328 | Morin et al. | Dec. 14, 1937 |
| 2,140,463 | Sundback | Dec. 13, 1938 |
| 2,174,159 | Marinsky | Sept. 26, 1939 |
| 2,242,794 | Puschner et al. | May 20, 1941 |
| 2,268,571 | Corner | Jan. 6, 1942 |